US010377376B2

(12) United States Patent
Diedrich et al.

(10) Patent No.: US 10,377,376 B2
(45) Date of Patent: Aug. 13, 2019

(54) VEHICLE WITH ENVIRONMENTAL CONTEXT ANALYSIS

(71) Applicant: Ford Global Technologies, LLC, Dearborn, MI (US)

(72) Inventors: Jonathan Diedrich, Carleton, MI (US); Robert Klosek, Dearborn, MI (US); Eric Reed, Livonia, MI (US); Adil Nizam Siddiqui, Farmington Hills, MI (US); Scott Howard Gaboury, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 185 days.

(21) Appl. No.: 15/418,556

(22) Filed: Jan. 27, 2017

(65) Prior Publication Data

US 2018/0099663 A1    Apr. 12, 2018

Related U.S. Application Data

(60) Provisional application No. 62/405,183, filed on Oct. 6, 2016.

(51) Int. Cl.
*B60W 30/09*    (2012.01)
*B60W 30/095*    (2012.01)
(Continued)

(52) U.S. Cl.
CPC ........ *B60W 30/09* (2013.01); *B60W 30/0953* (2013.01); *B60W 30/0956* (2013.01);
(Continued)

(58) Field of Classification Search
CPC .... B60W 30/08; B60W 30/09; B60W 30/095; B60W 30/0953; B60W 30/0956;
(Continued)

(56) References Cited

U.S. PATENT DOCUMENTS

| 5,479,173 A | 12/1995 | Yoshioka et al. |
| 5,617,085 A | 4/1997 | Tsutsumi et al. |

(Continued)

FOREIGN PATENT DOCUMENTS

| CA | 2658963 A1 | 9/2010 |
| DE | 102010032063 A1 | 5/2011 |

(Continued)

OTHER PUBLICATIONS

Viper SmartStart Remote Start System, http://www.viper.com/smartstart/product/vss4x10/viper-smartstart-remote-start-system>.

(Continued)

*Primary Examiner* — Adam R Mott
(74) *Attorney, Agent, or Firm* — Frank Lollo; Neal, Gerber & Eisenberg LLP; James P. Muraff

(57) ABSTRACT

A host vehicle may include: motor(s), brakes, sensors, processor(s) configured to: (a) predict a target path of a target vehicle based on lane boundaries of a virtual map; (b) compare the target path to a predicted host path of the host vehicle; (c) apply the brakes based on the comparison; (d) predict the target path and the host path as shapes, each having a two-dimensional surface area; (e) determine whether the shapes intersect, and based on the determination, (f) calculate a first timespan where the target vehicle reaches the intersection, and (g) a second timespan where the host vehicle reaches the intersection.

19 Claims, 14 Drawing Sheets

(51) Int. Cl.
*B60W 50/14* (2012.01)
*B60W 40/072* (2012.01)
*G06K 9/00* (2006.01)
*G06T 11/60* (2006.01)

(52) U.S. Cl.
CPC .......... *B60W 40/072* (2013.01); *B60W 50/14* (2013.01); *G06K 9/00798* (2013.01); *G06T 11/60* (2013.01); *B60W 2050/146* (2013.01)

(58) Field of Classification Search
CPC ............... B60W 40/072; B60W 50/14; B60W 2050/146; G06K 9/00798; G06T 11/60
See application file for complete search history.

(56) References Cited

U.S. PATENT DOCUMENTS

| | | | |
|---|---|---|---|
| 6,889,171 | B2 | 5/2005 | Skrbina et al. |
| 7,248,151 | B2 | 7/2007 | Mc Call |
| 8,798,809 | B2 | 8/2014 | Kalhous et al. |
| 9,110,772 | B2 | 8/2015 | Huntzicker et al. |
| 9,248,834 | B1 * | 2/2016 | Ferguson ............... B60W 30/09 |
| 2007/0043502 | A1 * | 2/2007 | Mudalige ................... B60T 7/22 |
| | | | 701/301 |
| 2010/0198428 | A1 | 8/2010 | Sultan et al. |
| 2011/0087433 | A1 | 4/2011 | Yester |
| 2013/0099911 | A1 | 4/2013 | Mudalige |
| 2014/0293753 | A1 | 10/2014 | Pearson |
| 2015/0314750 | A1 | 11/2015 | Van Wiemeersch et al. |
| 2016/0335892 | A1 * | 11/2016 | Okada ....................... B60T 7/22 |

FOREIGN PATENT DOCUMENTS

| | | |
|---|---|---|
| JP | 2010249613 A | 11/2010 |
| JP | 2012014219 A | 1/2012 |
| WO | WO 2015038048 A1 | 3/2015 |

OTHER PUBLICATIONS

Seytek Mobilink 5000 Smartphone Integration Remote Start Car Alarm Keyless Entry System with Full Vehicle Tracking, https://www.amazon.com/Scytek-MobiLink-5000-Smartphone-Integration/dp/B00B4L2OB2>.

Tesla Shifting Autopilot from Camera to Radar-Based Sensing, David Z. Morris, (Sep. 11, 2016), FORTUNE, http://fortune.com/2016/09/11/tesla-autopilot-shift/.

Search Report dated Mar. 5, 2018 GB Patent Application No. GB1715594.6 (3 pages).

* cited by examiner

Prior Art

Prior Art

VEHICLE WITH ENVIRONMENTAL CONTEXT ANALYSIS

PRIORITY CLAIM

This application claims the benefit of U.S. Provisional Application No. 62/405,183 to Diedrich, filed on Oct. 6, 2016, which is hereby incorporated by reference in its entirety.

TECHNICAL FIELD

This application relates to environmental context (e.g., traffic lane markers) for vehicles.

BACKGROUND

Existing vehicles are configured to predict a collisions based on a velocity of the existing vehicle and a velocity of a target vehicle. Many of these predictions, however, fail to account for likely changes in velocity of the target vehicle based on environmental context. For example, if the target vehicle is traveling in a circular lane, the velocity of the target vehicle (velocity includes heading or direction) will likely rotate to follow the circular lane. Solutions are thus needed to factor environmental context into collision predictions.

SUMMARY

A host vehicle may include: motor(s), brakes, sensors, processor(s) configured to: (a) predict a target path of a target vehicle based on lane boundaries of a virtual map; (b) compare the target path to a predicted host path of the host vehicle; (c) apply the brakes based on the comparison; (d) predict the target path and the host path as shapes, each having a two-dimensional surface area; (e) determine whether the shapes intersect, and based on the determination, (f) calculate a first timespan where the target vehicle reaches the intersection, and (g) a second timespan where the host vehicle reaches the intersection.

BRIEF DESCRIPTION OF THE DRAWINGS

For a better understanding of the invention, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

DETAILED DESCRIPTION OF EXAMPLE EMBODIMENTS

Figure 1:
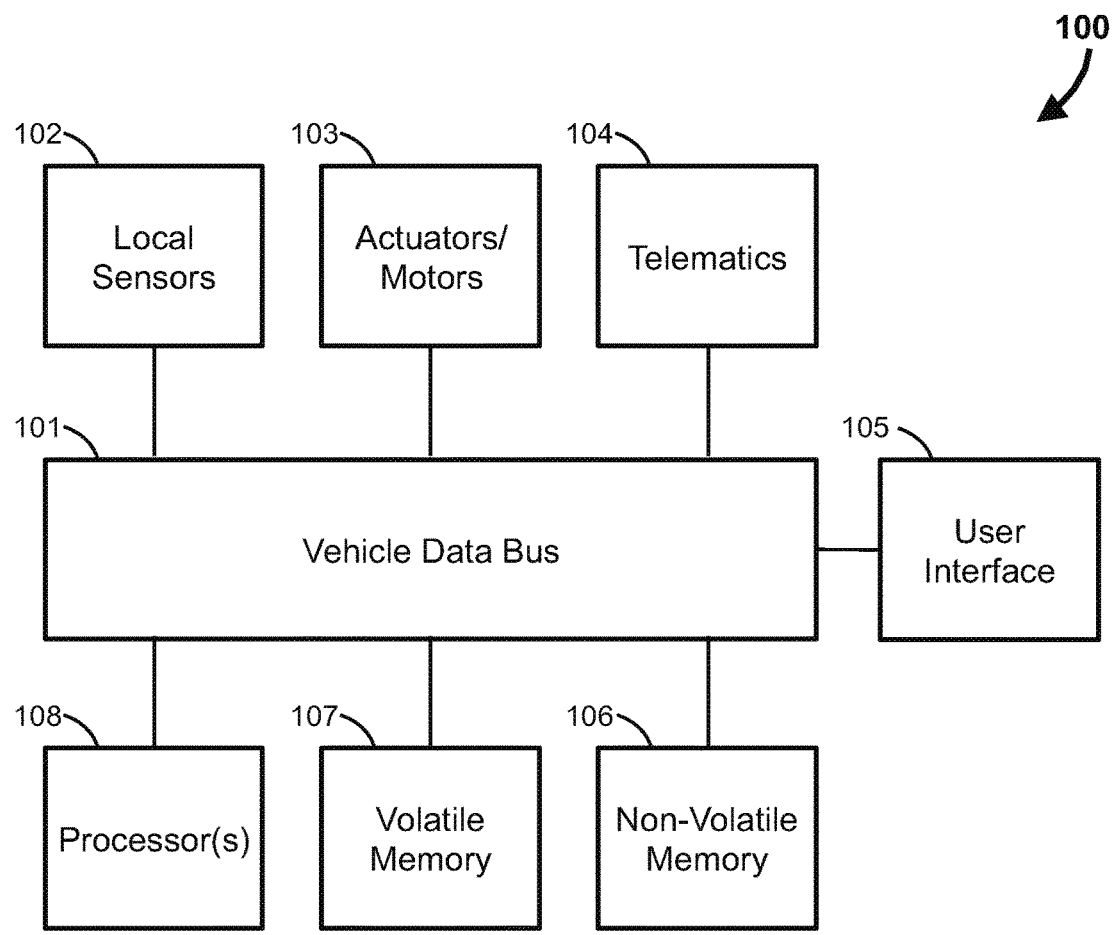
FIG. 1 is a block diagram of a vehicle computing system.

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present, as one option, and mutually exclusive alternatives as another option. In other words, the conjunction "or" should be understood to include "and/or" as one option and "either/or" as another option.

FIG. 1 shows a computing system 100 of host vehicle 200. Host vehicle 200 is connected, meaning that host vehicle 200 is configured to (a) receive wireless data from external entities (e.g., infrastructure, servers, other connected vehicles) and (b) transmit wireless data to external entities. Host vehicle 200 may be autonomous, semi-autonomous, or manual. Host vehicle 200 includes a motor, a battery, at least one wheel driven by the motor, and a steering system configured to turn the at least one wheel about an axis. Host vehicle 200 may be fossil fuel powered (e.g., diesel, gasoline, natural gas), hybrid-electric, fully electric, fuel cell powered, etc.

Vehicles are described, for example, in U.S. patent application Ser. No. 15/076,210 to Miller, U.S. Pat. No. 8,180,547 to Prasad, U.S. patent application Ser. No. 15/186,850 to Lavoie, U.S. Patent Publication No. 2016/0117921 to D'Amato, and U.S. patent application Ser. No. 14/972,761 to Hu, all of which are hereby incorporated by reference in their entireties. Host vehicle 200 may include any of the features described in Miller, Prasad, Lavoie, D'Amato, and Hu.

Computing system 100 resides in host vehicle 200. Computing system 100, among other things, enables automatic control of mechanical systems within host vehicle 200 and facilitates communication between host vehicle 200 and external entities (e.g., connected infrastructure, the Internet, other connected vehicles). Computing system 100 includes a data bus 101, one or more processors 108, volatile memory 107, non-volatile memory 106, user interfaces 105, a telematics unit 104, actuators and motors 103, and local sensors 102.

Data bus 101 traffics electronic signals or data between the electronic components. Processor 108 performs operations on electronic signals or data to produce modified electronic signals or data. Volatile memory 107 stores data for near-immediate recall by processor 108. Non-volatile memory 106 stores data for recall to the volatile memory 107 and/or the processor 108. Non-volatile memory 106 includes a range of non-volatile memories including hard drives, SSDs, DVDs, Blu-Rays, etc. User interface 105 includes displays, touch-screen displays, keyboards, buttons, and other devices that enable user interaction with the computing system. Telematics unit 104 enables both wired and wireless communication with external entities via Bluetooth, cellular data (e.g., 3G, LTE), USB, etc.

Actuators/motors 103 produce tangible results. Examples of actuators/motors 103 include fuel injectors, windshield wipers, brake light circuits, transmissions, airbags, motors mounted to sensors (e.g., a motor configured to swivel a local sensor 102), engines, power train motors, steering, blind spot warning lights, etc.

Local sensors 102 transmit digital readings or measurements to processors 108. Examples of local sensors 102 include temperature sensors, rotation sensors, seatbelt sensors, speed sensors, cameras, lidar sensors, radar sensors, infrared sensors, ultrasonic sensors, clocks, moisture sensors, rain sensors, light sensors, etc. It should be appreciated that any of the various electronic components of FIG. 1 may include separate or dedicated processors and memory. Further detail of the structure and operations of computing system 100 is described, for example, in Miller, Prasad, Lavoie, and Hu.

Figure 2:
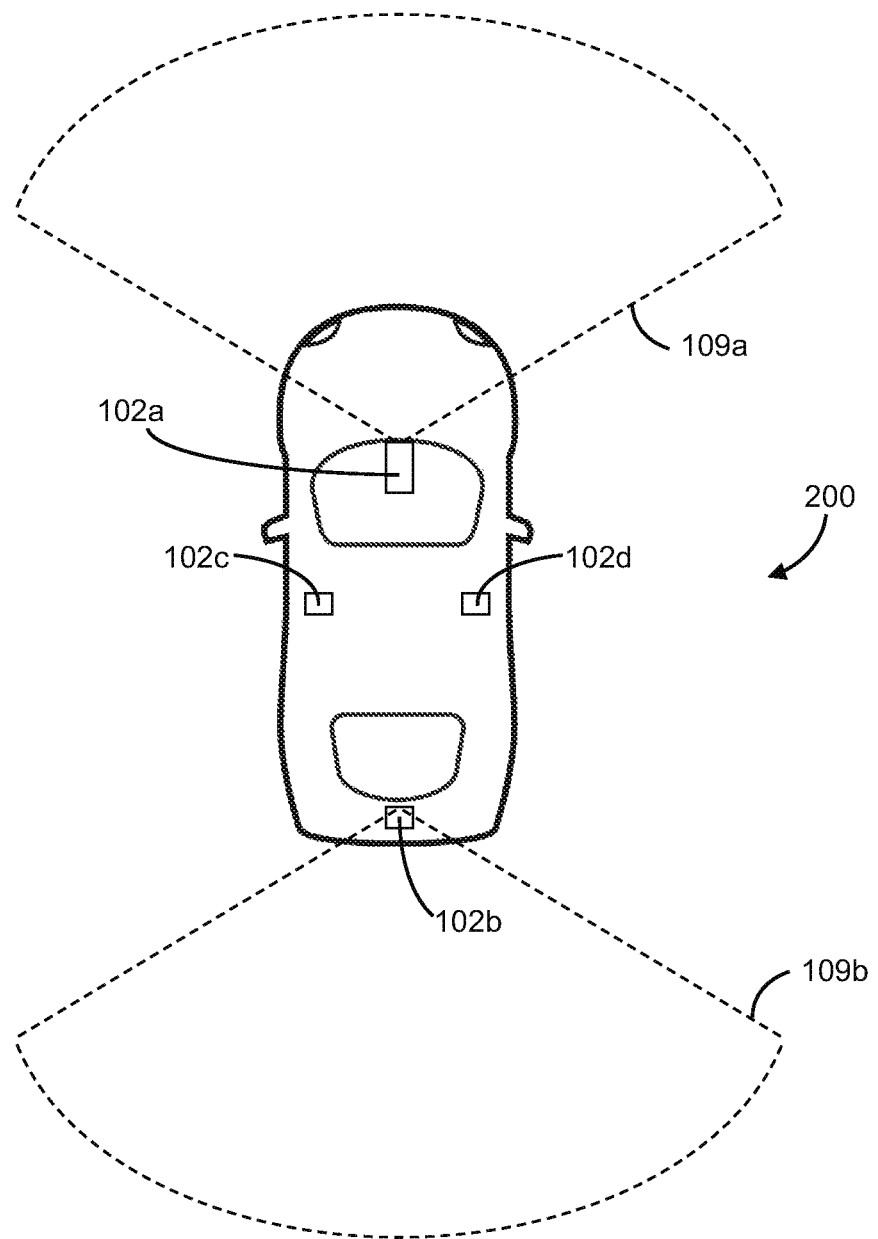
FIG. 2 is a top plan view of a host vehicle including the vehicle computing system.

FIG. 2 generally shows and illustrates host vehicle 200, which includes computing system 100. Some of the local sensors 102 are mounted on an exterior of host vehicle 200 (others are located inside the vehicle 200). Local sensor 102*a* is configured to detect objects leading the vehicle 200. Local sensor 102*b* is configured to detect objects trailing the vehicle 200 as indicated by trailing sensing range 109*b*. Left sensor 102*c* and right sensor 102*d* are configured to perform similar functions for the left and right sides of the vehicle 200.

As previously discussed, local sensors 102*a* to 102*d* may be ultrasonic sensors, lidar sensors, radar sensors, infrared sensors, cameras, microphones, and any combination thereof, etc. Host vehicle 200 includes a plurality of other local sensors 102 located in the vehicle interior or on the vehicle exterior. Local sensors 102 may include any or all of the sensors disclosed in Miller, Prasad, Lavoie, D'Amato, and Hu. The general arrangement of components shown in FIGS. 1 and 2 is prior art.

It should be appreciated that host vehicle 200, and more specifically, processors 108 of host vehicle 200, is/are configured to perform the methods and operations described herein. In some cases, host vehicle 200 is configured to perform these functions via computer programs stored on volatile 107 and/or non-volatile 106 memories of computing system 100.

One or more processors are "configured to" perform a disclosed method step, block, or operation, at least when at least one of the one or more processors is in operative communication with memory storing a software program with code or instructions embodying the disclosed method step or block. Further description of how processors, memory, and software cooperate appears in Prasad. According to some embodiments, a mobile phone or external server(s) in operative communication with host vehicle 200 perform some or all of the methods and operations discussed below.

According to various embodiments, host vehicle 200 includes some or all of the features of vehicle 100*a* of Prasad. According to various embodiments, computing system 100 includes some or all of the features of VCCS 102 of FIG. 2 of Prasad. According to various embodiments, host vehicle 200 is in communication with some or all of the devices shown in FIG. 1 of Prasad, including nomadic or mobile device 110, communication tower 116, telecom network 118, Internet 120, and data processing center (i.e., one or more servers) 122. Each of the entities described in this application (e.g., the connected infrastructure, the other vehicles, mobile phones, servers) may share any or all of the features described with reference to FIGS. 1 and 2.

The term "loaded vehicle," when used in the claims, is hereby defined to mean: "a vehicle including: a motor, a plurality of wheels, a power source, and a steering system; wherein the motor transmits torque to at least one of the plurality of wheels, thereby driving the at least one of the plurality of wheels; wherein the power source supplies energy to the motor; and wherein the steering system is configured to steer at least one of the plurality of wheels." Host vehicle 200 may be a loaded vehicle.

The term "equipped electric vehicle," when used in the claims, is hereby defined to mean "a vehicle including: a battery, a plurality of wheels, a motor, a steering system; wherein the motor transmits torque to at least one of the plurality of wheels, thereby driving the at least one of the plurality of wheels; wherein the battery is rechargeable and is configured to supply electric energy to the motor, thereby driving the motor; and wherein the steering system is configured to steer at least one of the plurality of wheels." Host vehicle 200 may be an equipped electric vehicle.

Figure 3:
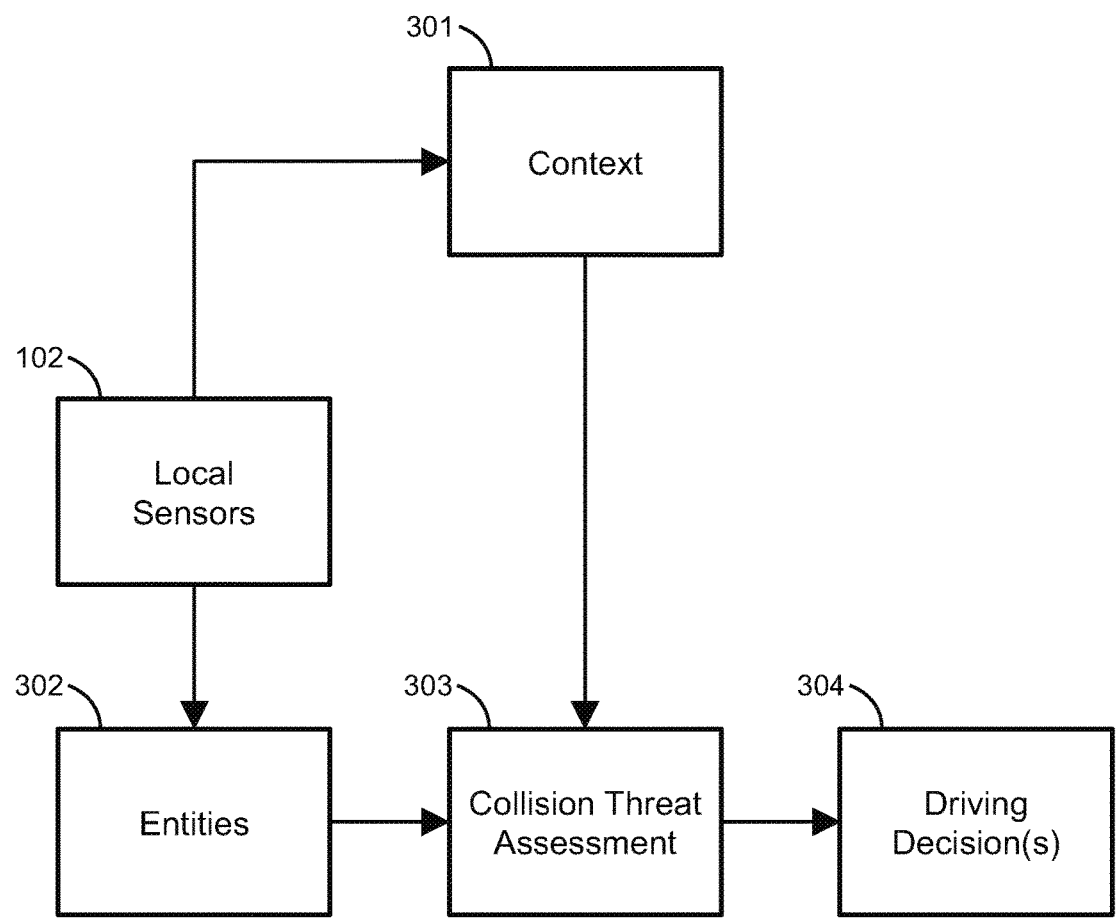
FIG. 3 is a block diagram corresponding to a collision threat assessment.

FIG. 3 is a block diagram of generating driving decisions based on (a) sensed external entities and (b) sensed environmental context (also referred to as context). Driving decisions include any instruction that effects a physical, tangible change in host vehicle 200. Driving decisions include instructions to accelerate, decelerate (e.g., brake), re-route, re-path (i.e., adjust heading), and issue a warning (e.g., blink a light, generate audio). Driving decisions may further include any instruction that effects a physical, tangible change in an external vehicle. External entities are physical, tangible external objects and include external vehicles, pedestrians, obstructions (e.g., buildings, walls, potholes). Environmental context is typically non-physical and non-tangible (although environmental context is sensed with reference to physical and tangible objects such as street signs, painted road markers, non-drivable area such as grass). Environmental context thus represents human-imposed rules associated with driving. Examples of rules include speed limits, off-limit areas, assigned traffic flow directions, assigned stopping points (as indicated by, among other things, stop signs and red lights).

Context and entities may be derived from local sensors 102 and/or telematics 104 (e.g., previously generated street maps received from servers, external vehicles, and external infrastructure). Although cameras maybe be configured to sense external entities, the processing software required to convert images into coordinates of external entities is inefficient and sometimes, inaccurate. Cameras, however, are efficient at capturing contrast and color. Processing software associated with infrared sensors, radar sensors, lidar sensors, and/or ultrasonic sensors is efficient at converting measurements from sensors into coordinates of external entities. This processing software is inefficient at, and sometimes incapable of, capturing color and contrast. Put differently, cameras excel at capturing two-dimensional, but not three-dimensional information while infrared sensors, radar sensors, lidar sensors, and/or ultrasonic sensors excel at capturing three-dimensional, but not two-dimensional information, While measuring the environment, image from a camera local sensor 102 may be insufficient due to limited environmental lighting or weather conditions. To add robustness to the context measurement system, vector or raster based graphics data can be passed to the image processing algorithms onboard host vehicle 200 by a navigation system (comprised of stored map data, gps, compass). These images can be used to refine the regions in which the image processing subsystem performs context analysis or increase the confidence of an environmental classification used to make braking/acceleration/path planning decisions.

As a practical matter, context markers are often two-dimensional or effectively two-dimensional. For example, letters printed on a road sign are effectively two dimensional. A computer is best able to discern printed letters from environmental noise by comparing contrast and/or color of the printed letters to surrounding environment. Similarly, painted lane lines are effectively two dimensional. A computer is best able to discern painted lane lines from environmental noise by comparing contrast or color of the painted lane lines to surrounding environment. Host vehicle 200 may be thus be configured to resolve environmental context with camera local sensors 102 and external entities (static or dynamic) with non-camera local sensors such as radar, lidar, ultrasonic local sensors 102.

With reference to FIG. 3, host vehicle 200 extracts context 301 from sensors 102 and/or data received via telematics 104 (e.g., a database including speed limits of roads and a street map). Host vehicle 200 extracts entities 302 from local sensors 102 and/or data received via telematics 104. Extracted entities include properties such as position, two or three dimensional size and shape, velocity, acceleration, heading, identity (e.g., animal, pedestrian, vehicle).

Once external entities have been resolved, the external entities are analyzed in light of context to produce collision threat assessments 303. Collision threat assessments include, for example, time to collision and/or distance to collision, etc. Collision threat assessments take into account projected future properties of the external entities and/or host vehicle 200. For example, a time to collision analysis may assume that an external entity traveling at a certain speed remains at the certain speed and host vehicle 200 remains at its current speed. Host vehicle 200 generates driving decisions 304 based on the collision threat assessments 303.

Methods of extracting entities and properties thereof from local sensors are known in the art. Methods of determining collision threats are known in the art. Some methods of determining collision threats are disclosed in U.S. patent application Ser. No. 15/183,355 to Bidner, which is hereby incorporated by reference in its entirety.

Figure 4:
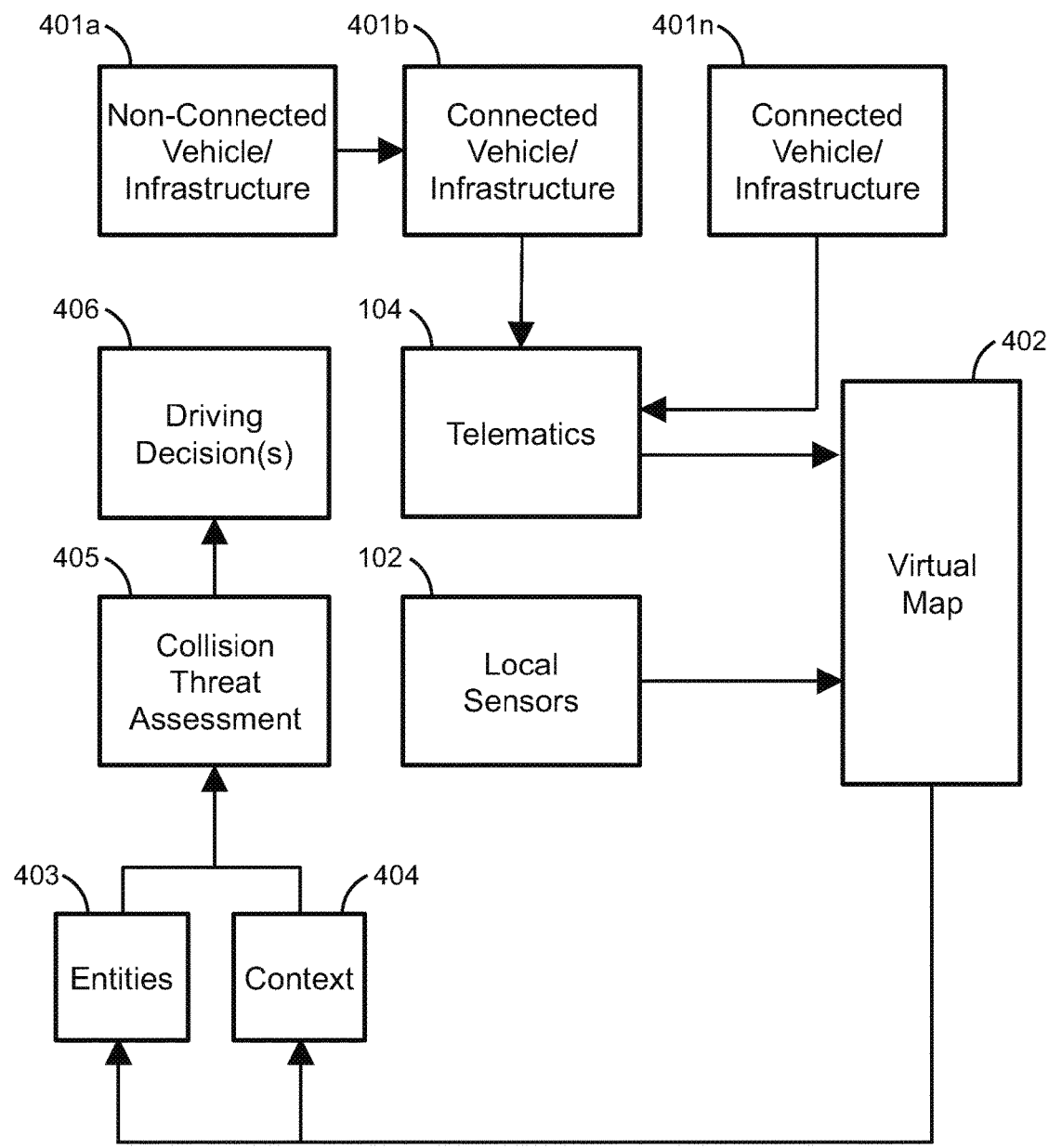
FIG. 4 is a more specific embodiment of the block diagram of FIG. 3.

FIG. 4 is a more specific embodiment of the methods and operations discussed with reference to FIG. 3. External entities 401a to 401n transmit data to host vehicle 200 via telematics 104. Some external entities (e.g., external entity 401b) may proxy for non-connected external entities (e.g., external entity 401a). Telematics 104 forwards the received data to processors 108 and/or memory 106, 107. Local sensors 102 forward the sensed data (e.g., measurements) to processors 108 and/or memory 106, 107.

Processors 108 build a virtual map 402 area surrounding host vehicle 200 based on the forwarded data. Virtual map 402 need not be graphically displayed or displayable. As one example, virtual map 402 can be embodied as objects and attributes thereof stored in memory 106, 107. Suitable programming or software to construct virtual maps based on sensed (i.e., received) data (such as street maps) is known in the art. The virtual map may be two or three dimensional. The virtual map includes resolved, detected, or received entities 403 placed in resolved, detected, or received context 404. Context includes some or all of:

(A) Surface location and identity, which includes (i) non-drivable or out-of-bounds surface and (ii) drivable surface. Drivable surface may be broken down or segmented by speed limit. Host vehicle 200 determines drivable surfaces via received map information from external sources. Local context sensors 102 supplement this information via contrast and/or color of images. Image processing programming software resolves drivable surface based on contrast and/or color and separates drivable surface from non-drivable surface accordingly. For example, surface appearing in green and outside of lanes is marked as non-drivable surface.

(B) Lanes of drivable surface, which includes (i) location of lanes and (ii) identity of lanes. Location of lanes includes some or all of: lane length, lane width, lane coordinates, lane curvature, and number of lanes. Identity of lanes corresponds to rules of the lanes. Rules include direction of traffic flow and lane change legality. Host vehicle 200 determines lanes and the properties thereof via received map information from external sources. Local sensors 102 supplement this information via contrast and/or color of images. Image processing programming software resolves lane lines based on contrast and/or color. Processors 108 determine any of the above lane properties based on the resolved lane lines.

(C) Parking spots on drivable surface, which includes (i) location of parking spots and (ii) identity of parking spots. Location of parking spots includes width and depth of the parking spots. Identity of parking spots includes rules associated with the parking spot (e.g., only parallel parking permitted, only handicap parking permitted). Host vehicle 200 determines parking spots and the properties thereof via received map information from external sources. Local sensors 102 supplement this information via contrast and/or color of images. Image processing programming software resolves boundaries of parking spots (e.g., painted parking lines) based on contrast and/or color of the images. Processors 108 determines any of the above lane properties based on the resolved boundaries.

As previously discussed, host vehicle 200 applies resolved context to resolved entities. Application of resolved context to resolved entities includes predicting or estimating future properties (e.g., location, speed, acceleration, heading) of resolved entities based on resolved context. Thus, predicted or estimated future properties of resolved entities depend at least on (a) current properties of resolved entities and (b) context. Examples are provided below.

As previously described, host vehicle 200 performs a collision threat assessment 405 of resolved entities based on the predicted or estimated future properties thereof. As previously described, host vehicle 200 generates driving decisions 406 based on collision threat assessments 405.

Figure 5:
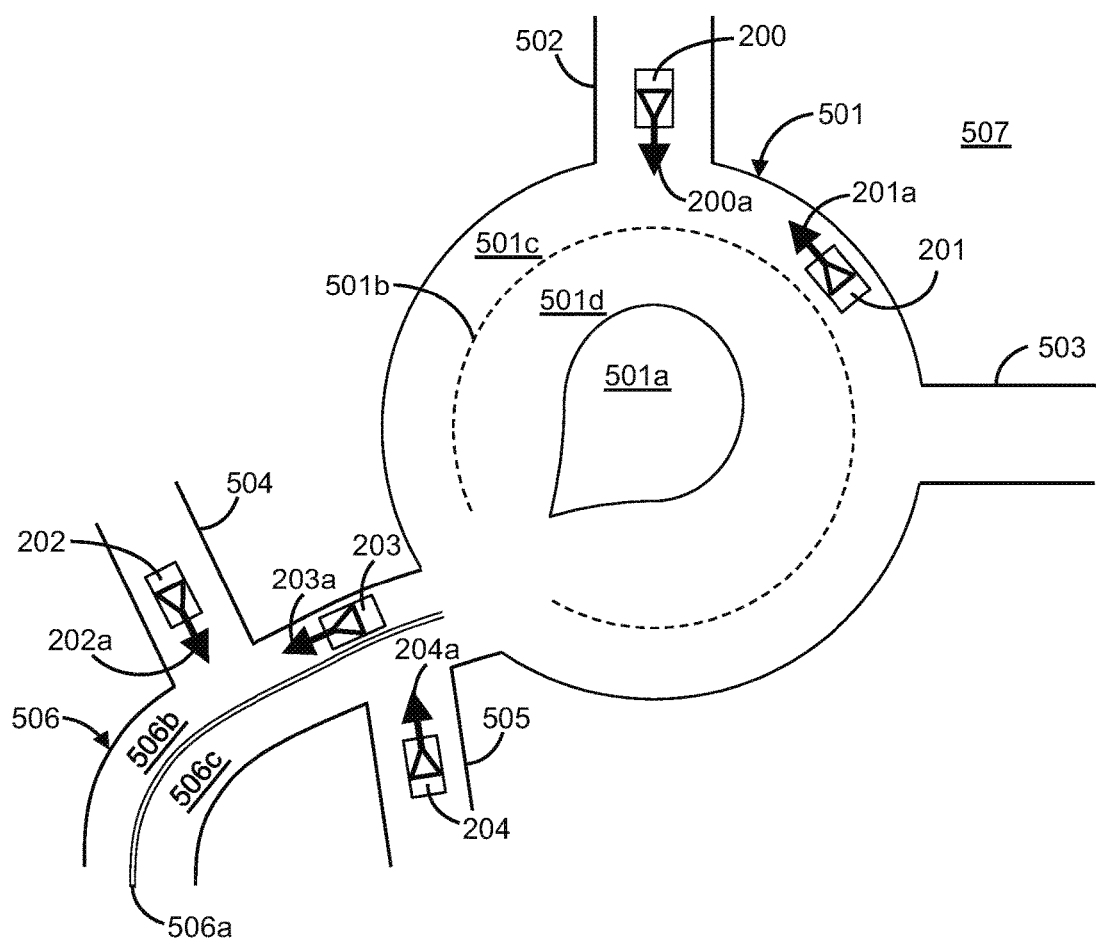
FIG. 5 is a first traffic scenario and represents one kind of virtual map presented in graphical form.

FIG. 5 illustrates an example virtual map of host vehicle 200. A traffic circle 501 intersects roads 502, 503, and 506. Road 502 is one-way in the direction from host vehicle 200 toward traffic circle center 501a. Road 506 intersects roads 505 and 504. Traffic circle includes lanes 501c and 501d separated by lane line 501b and a non-drivable center 501a. Lanes 501c and 501d carry parallel traffic flow as indicated by dotted lane line 501b. Road 506 includes lanes 506b and 506c. Lane 506b carries traffic in an opposite direction of lane 506c as indicated by double lane line 506a. Host vehicle 200 is on road 502 with a velocity 200a (velocity includes a speed and a heading). Second vehicle 201 is in lane 501c of traffic circle 501 with velocity 200b. Third vehicle 202 is on road 504 with velocity 202a. Fourth vehicle 203 is in lane 506b of road 506 with velocity 203a. Fifth vehicle 204 is on road 505 with velocity 204a.

As shown in FIG. 5, each vehicle is represented by a box. Each box includes a triangle (not labeled). Each triangle is pointed toward the front bumper of the corresponding vehicle. In other figures, the triangles may be of different sizes. Such size variation, unless indicated otherwise, is not intended to convey underlying meaning and is simply a drafting technique applied to enhance clarity.

Host velocity 200a is zero such that host vehicle 200 is stopped. Second velocity 201a includes a heading 201a pointed at host vehicle 200. Thus, if host vehicle 200 were to remain stopped and if second vehicle 201 were to continue traveling along second heading 201a (as stated above, velocity includes heading), host vehicle 200 and second vehicle 201 would collide.

Lane 501c, however, is curved. If second vehicle 201 follows lane 501c, second heading 201a will rotate to remain parallel with lane 501c. Based on context (i.e., curvature of lane 501c), host vehicle 200 projects that second heading 201a will follow lane 501c. A collision threat assessment between host vehicle 200 and second vehicle 201 yields zero or a low probability of collision. As a result, host vehicle 200 does not generate a driving decision (e.g., an evasive maneuver) based on an expected collision between host vehicle 200 and second vehicle 201. According to some embodiments, driving decisions are based on a magnitude of the probability of collision.

Figure 6:
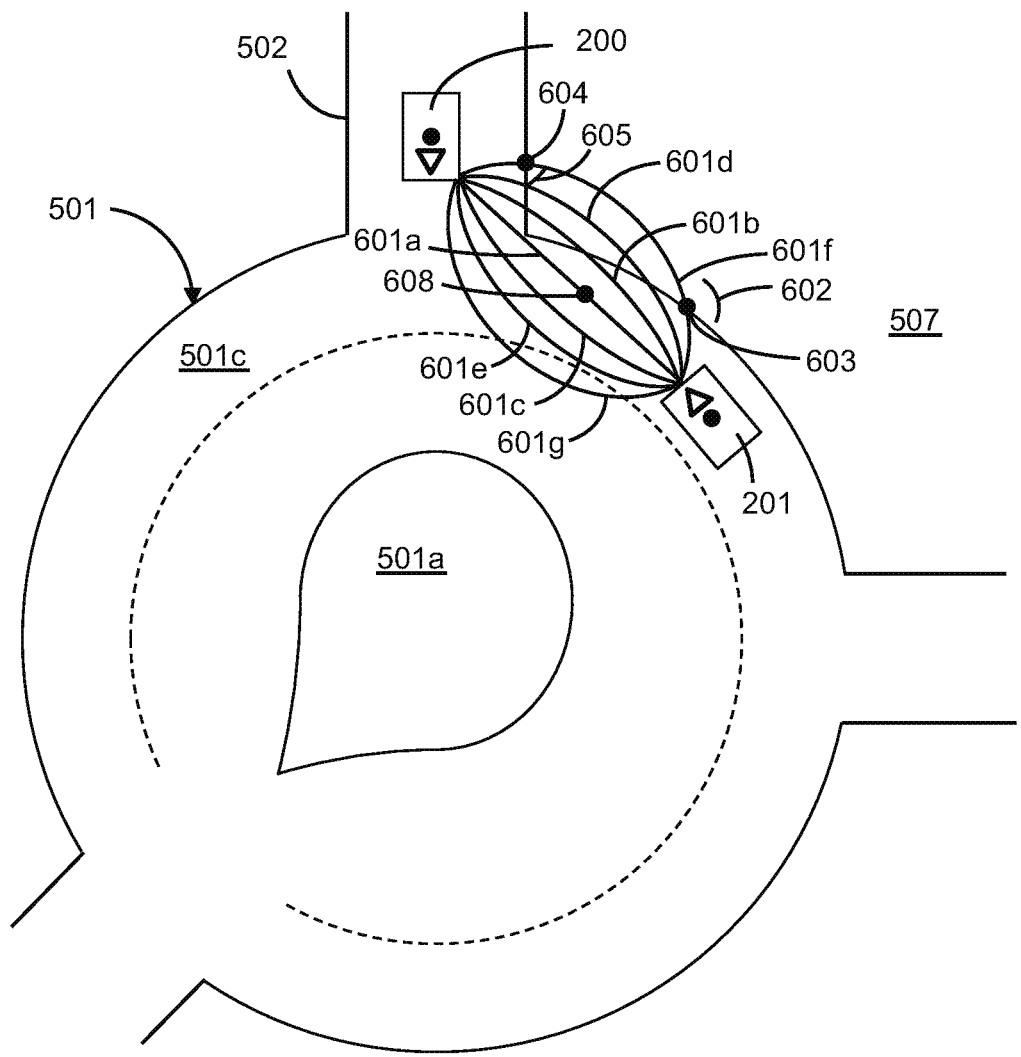
FIG. 6 shows possible operations associated with the first, second, and third traffic scenarios.
Figure 7:
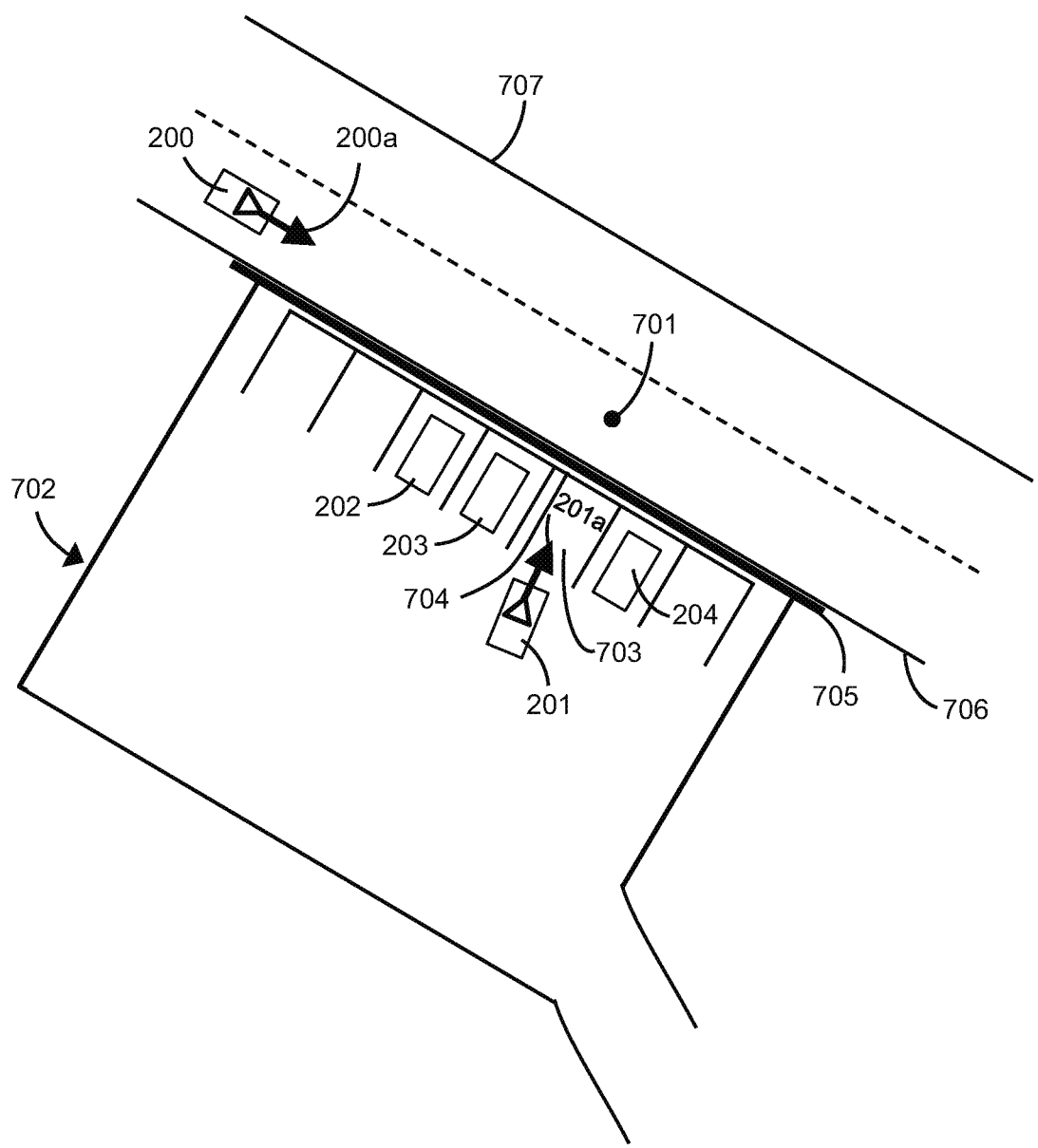
FIG. 7 is a second traffic scenario and represents one kind of virtual map presented in graphical form.

FIGS. 6 and 7 relate to first embodiments of a collision threat assessment. FIGS. 8 to 14 relate to second embodiments of a collision threat assessment. Features of both the first and second embodiments may be combined.

With reference to FIG. 6, host vehicle 200 responds to a trigger by computing a reference segment 601a extending from second vehicle 201 to host vehicle 200. The trigger is based on position and velocity of host vehicle 200 and position and velocity of second vehicle 201.

In FIG. 6, reference segment 601a is the shortest segment connecting second vehicle 201 to host vehicle 200. According to other embodiments, reference segment 601a is from a midpoint of host vehicle 200 to a midpoint of a leading surface of second vehicle 201. Host vehicle 200 computes a series of curved segments 601b to 601g intersecting both ends of reference segment 601a. Curved segments 601b to 601g may be spaced at predetermined intervals. Curved segments 601b to 601g observe predetermined geometrical functions. Some or all may be parabolic. A total number of curved segments 601b to 601g computed by first vehicle 200 are based on (a) the predetermined intervals and (b) velocity and/or acceleration of host vehicle 200 and/or second vehicle 201. A number of curved segments on each side of reference segment 601a is based on velocity and/or acceleration of host vehicle 200 and/or second vehicle 201.

Outer curved segments 601f and 601g correspond to extreme paths of second vehicle 201. For example, based on second velocity 201a, outer curved segments 601f and 601g represent the most extreme curved collision paths between second vehicle 201 and host vehicle 200 that would not result in second vehicle 201 becoming uncontrollable (e.g., spinning out or flipping). Host vehicle 200 is preloaded with one or more functions that determine curvature of outer curved segments 601f and 601g based on properties of second vehicle 201 (e.g., velocity).

According to an embodiment, host vehicle 200, after determining reference segment 601a, determines outer curved segments 601f and 601g, and then populates a first predetermined number of interim curved segments 601c and 601e between outer curved segment 601g and reference segment 601a and a second predetermined number of interim curved segments between outer curved segment 601f and reference segment 601a. The first and second predetermined numbers may be (a) preset, (b) equal, (c) based on an angle of reference segment 601a with respect to second velocity 201a.

Host vehicle 200 evaluates each segment 601 in light of context. Host vehicle 200 may determine, for each segment 601, a number of rules (derived from context as described above) broken by second vehicle 201. Host vehicle 200 may further determine a magnitude of each broken rule.

If second vehicle 201 were to follow segment 601f, second vehicle 201 would (a) illegally exit traffic circle 501 at angle 602, (b) illegally traverse non-drivable surface 507 for a distance defined between points 603 and 604, and (c) illegally enter road 502 at an angle 605. Angle 602, distance between points 603 and 604, and angle 605 corresponds to magnitudes of broken rules.

Instead of identifying each illegal action, host vehicle 200 may compute portions of each segment 601 corresponding to one or more broken rules. For example, reference segment 601a can be broken into a legal first portion extending from second vehicle 201 to point 608 and an illegal second portion extending from point 608 to host vehicle 200. While traversing the first portion of segment 601a, second velocity 201a would sufficiently match (i.e., match within predetermined limits) curvature of lane 501c to count as legal. While traversing the second portion of segment 601a, second velocity 201a would sufficiently deviate from curvature of lane 501c and eventually, road 502 to count as illegal. Thus, the magnitude of illegal activity of segment 601a would be at least related to the distance of the second portion. In contrast, all of segment 601g would qualify as illegal activity since at every point along segment 601g, second velocity 201a would sufficiently diverge from curvature of lane 501c and would eventually oppose direction of travel of road 502 (as stated above, road 502 is one-way toward center 501a.

Host vehicle 200 performs collision threat assessments for each segment 601 in light of one or more of: whether the segment 601 includes illegal activity (i.e., activity that violates context) and the magnitude or extent of the illegal activity. Segments 601 with greater magnitudes of illegal activity are discounted or deemed less probable. Host vehicle 200 sums the collision threat assessments of each segment 601. If the sum is above a predetermined probability threshold, host vehicle 200 generates a driving decision (e.g., controlling steering, braking, and/or acceleration) corresponding to an evasive maneuver (i.e., a maneuver calculated to (a) reduce probability of collision and/or (b) reduce probable differential velocity between host vehicle 200 and second vehicle 201 at collision).

Turning to FIG. 7, host vehicle 200 is traveling along two-lane-one-way road 707 with velocity 200a. Second vehicle 201 is pulling into parking space 703 of parking lot 702 with a velocity of 201a. Third, fourth, and fifth vehicles 202, 203, and 204 are already parked. Parking space 703 is defined by two side lines (not labeled) and an end line 704. A concrete barrier 705 separates road 707 from parking lot 702. Road 707 includes a painted line 706 adjacent and extending parallel to road 707.

Host vehicle 200, via local entity sensors, resolves vehicles 201 to 204 and assigns velocities thereto. Host vehicle 200 determines second velocity 201a (as stated above, velocities include a speed and a heading). Host vehicle 200 determines host velocity 200a. Host vehicle 200 resolves context at least partially via local context sensors 102a.

In one instance, host vehicle 200 identifies painted lines of the seven parking spots via image processing software. Host vehicle 200 compares the identified painted lines to preloaded reference parking spot geometries. Host vehicle 200 identifies that the width between the painted lines (corresponding to width of the parking spots) falls within a predetermined range of the widths in the preloaded reference parking spot geometries. Host vehicle 200 identifies that each parking spot is defined by three painted lines and is thus an open-rectangle, which matches at least some of the preloaded reference parking spot geometries. Host vehicle 200 identifies that the parking spots are grouped together into a plurality of adjacent parking spots. Host vehicle applies a parking spot context to parking spot 703 given some or all of these identifications. Host vehicle 200 confirms the parking spot context with map information received from an external server identifying the area associated with parking lot 702 as a parking lot.

In another instance, host vehicle 200 receives (or had previously received) information from an external server identifying coordinates of parking lot 702. Based on this previously received information, host vehicle 200 scans the coordinates of parking lot 702 with local sensors 102 and confirms that the received information is consistent with features of images taken by local sensors 102.

Concrete wall 705 is three-dimensional and may be resolved with local sensors 102. Host vehicle 200 marks concrete wall 705 as stable infrastructure and identifies that a height of concrete wall 705 exceeds vertical coordinates of parking lot 702.

Host vehicle 200 performs a collision threat assessment between second vehicle 201 and host vehicle 200. If host vehicle 200 were to continue at host velocity 200a and second vehicle 201 were to continue at second velocity 201a, host vehicle 200 and second vehicle 201 would collide at point 701.

However, host vehicle 200 projects future positions and future velocities of second vehicle 201 based on context. More specifically, host vehicle 200 projects that second velocity 201a will decrease in light of end line 704 of parking spot 703. Host vehicle 200 projects that a future position of second vehicle 201 will respect (i.e., not cross) end line 704. Host vehicle 200 performs a similar analysis with respect to concrete barrier 705 and painted line 706. It should thus be appreciated that when performing collision threat assessments, host vehicle 200 projects future velocities of entities based on resolved context.

According to some embodiments, the trigger for extending reference segment 601a between host vehicle 200 and second vehicle 201 is based on an absence of entities (including infrastructure such as concrete barrier 705) obstructing collision paths of second vehicle 201 with host vehicle 200. Entities obstruct collision paths when the entities are solid with at least a predetermined thickness, intersect a ground plane at a predetermined range of angles and terminate at least a predetermined height above ground adjacent to the infrastructure on the side nearest second vehicle 201. Here, concrete barrier 705 exceeds the predetermined thickness, intersects ground at 90 degrees (and thus falls within the predetermined range of angles) and extends a predetermined height above ground between end line 704 and concrete barrier 705. Host vehicle 200 thus does not extend reference segment 601a between host vehicle 200 and second vehicle 201.

FIGS. 8 to 14 relate to second embodiments of a collision threat assessment. These embodiments may include any features previously discussed with reference to the first embodiments of the collision threat assessment. The operations of FIGS. 8 to 14 may be applied to any collision threat assessment, not only a cross-traffic alert, and to any traffic situation (e.g., not only when host vehicle is reversing into a road).

Figure 8:
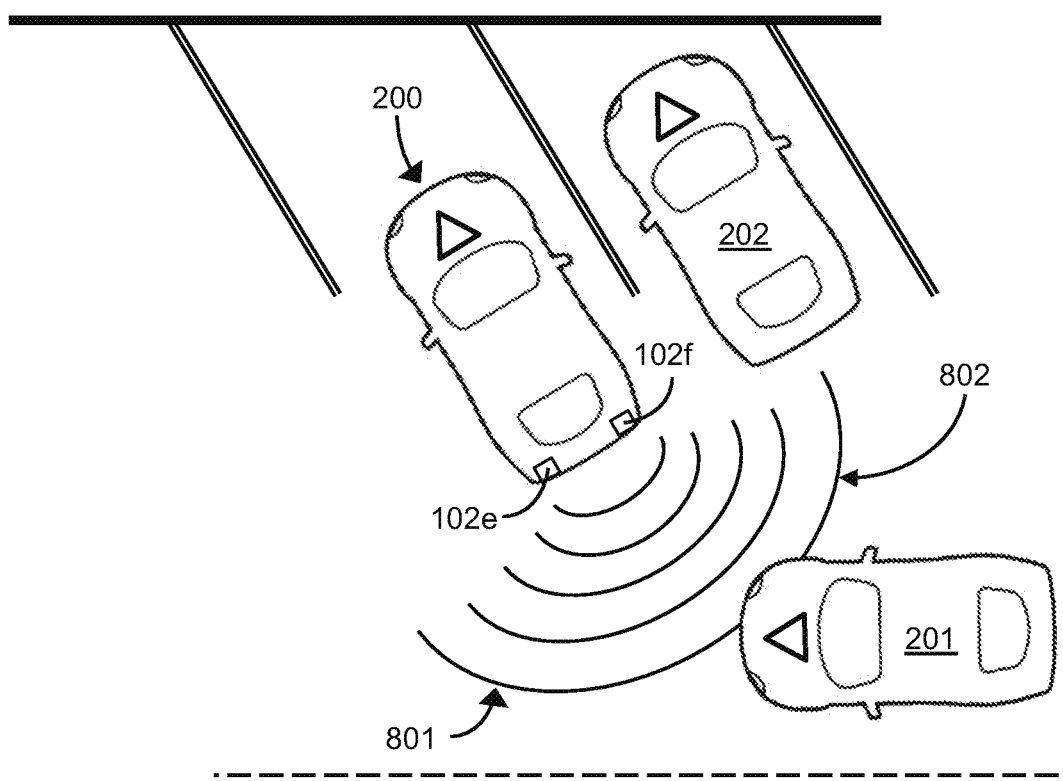
FIG. 8 illustrates features of a cross-traffic alert system.

With reference to FIGS. 8 to 14, host vehicle 200 may be configured to issue cross-traffic (CT) alerts, which are one form of a collision threat assessment. CT alerts warn the host driver when host vehicle 200 may back into cross-traffic. With reference to FIG. 8, CT alerts rely on local sensors 102. Rear local sensors 102b may include CT local sensors 102e and 102f, which are respectively configured to emit CT signal patterns 801 and 802. CT local sensors 102e and 102f may be radar, lidar, ultrasonic, or any other kind of sensor previously discussed with respect to local sensors 102.

Host vehicle 200 (and more specifically processors 108, as previously discussed) is/are configured to project a path of external entities detected with CT local sensors. The general concept of CT alerts is known in the art.

With reference to FIG. 8, second vehicle 201 is projected to intersect (i.e., collide with) host vehicle 200 based on a position, velocity, and/or acceleration of second vehicle 201 as detected by CT local sensors 102e, 102f and based on a position, velocity, and/or acceleration of host vehicle 200 as detected by other local sensors 102. As a result, host vehicle 200 issues a CT alert. The CT alert may include a warning displayed on a user interface 105 (including a blinking light), an automatic application of brakes, etc. With continued reference to FIG. 8, although third vehicle 202 is detected, host vehicle 200 determines that third vehicle 202 is stopped. As a result, host vehicle 200 may ignore third vehicle 202.

Figure 9:
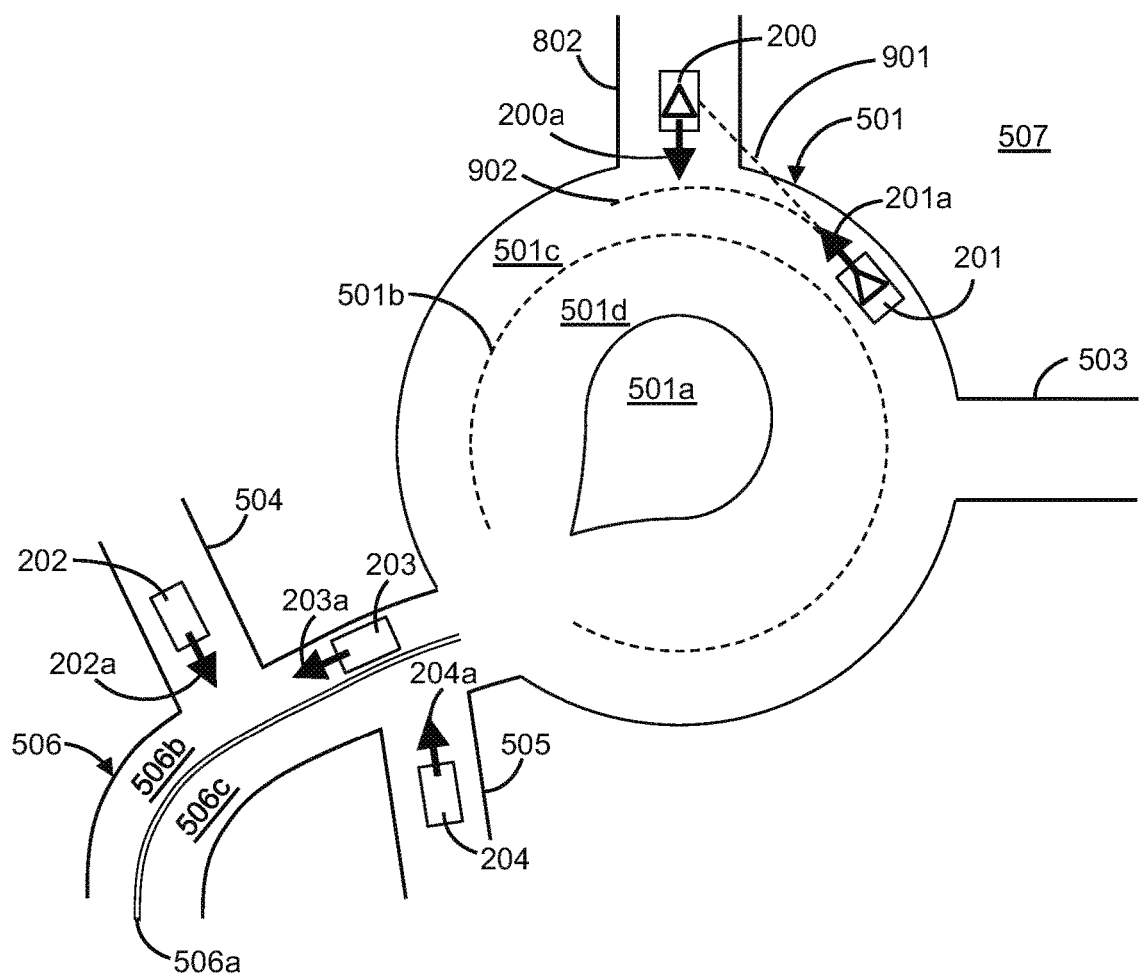
FIG. 9 is a third traffic scenario and represents one kind of virtual map presented in graphical form.
Figure 10:
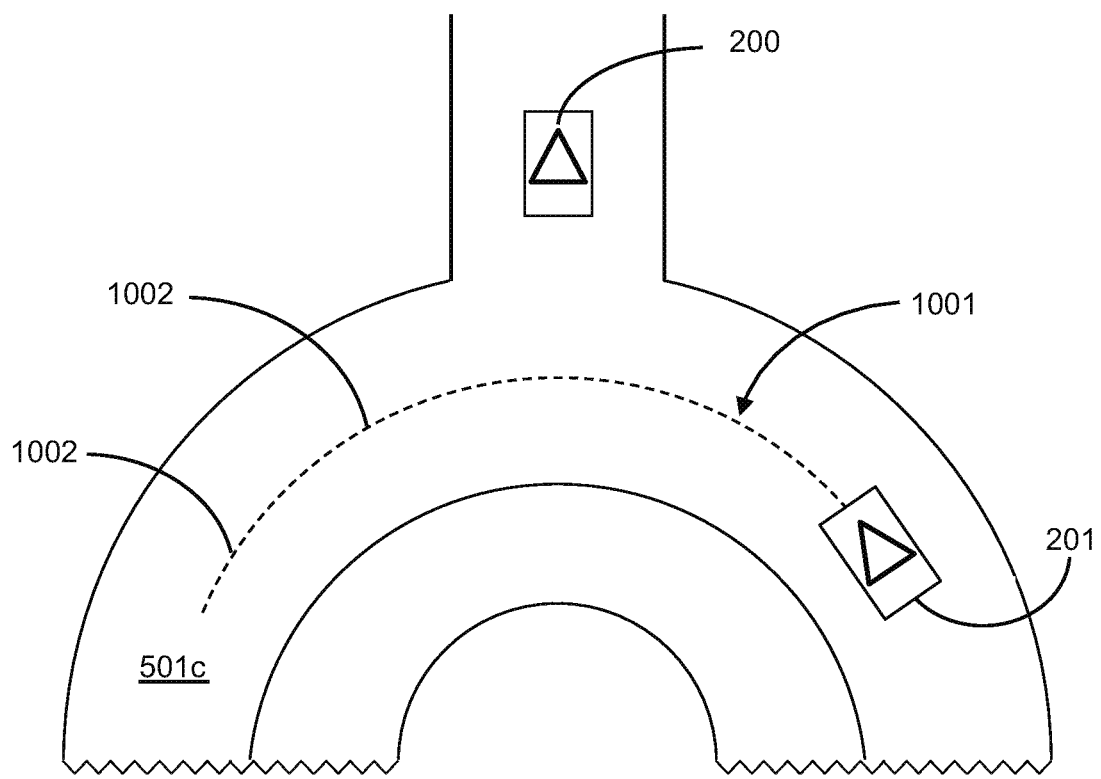
FIG. 10 shows possible operations associated with the first, second, and third traffic scenarios.

With reference to FIG. 9, host vehicle 200 is configured to apply virtual map 402 to enhance accuracy of the CT alerts. In FIG. 9, host vehicle 200 is in a driveway 802 and backing up into lane 501c. FIG. 9 is otherwise similar to FIG. 5. Under at least some existing CT alert systems, host vehicle 200 would incorrectly project the path of second vehicle 201 as path 901. Path 901 represents the path of second vehicle 201 if the instantaneous second velocity 201a was carried forward into the future. Second vehicle 201, however, is more likely to follow the curvature of lane 501c and thus path 902 is more likely to occur than path 901. Thus, under the at least some existing CT alert systems, host vehicle 200 would incorrectly project that stopping at a current position could result in a collision and backing into lane 501c would avoid a collision. The correct projection (or at least the project most likely to be accurate), however, is that host vehicle 200 immediately stopping in driveway 802 would avoid a collision while backing into lane 501c (and thus intersecting path 902) could result in a collision.

Host vehicle 200 is configured to arrive at the correct outcome by (a) detecting current properties of second vehicle 201 and (b) modifying those current properties in light of context. More specifically, and with reference to FIG. 10, host vehicle 200 proceeds through some or all of the following operations: first, the current properties (including current lane) of second vehicle 201 are detected; second, an ideal path 1001 and/or a practical path 1301 of second vehicle 201 is/are projected based on the virtual map data corresponding to the current lane of second vehicle 201.

To find ideal path 1001, coordinates of a series of points 1002 may be found. Identification of the coordinates is discussed with reference to FIG. 11. The above and below discussed paths may represent the location of a fixed point on second vehicle 201 (e.g., a position of the center of the front bumper of second vehicle 201).

Figure 11:
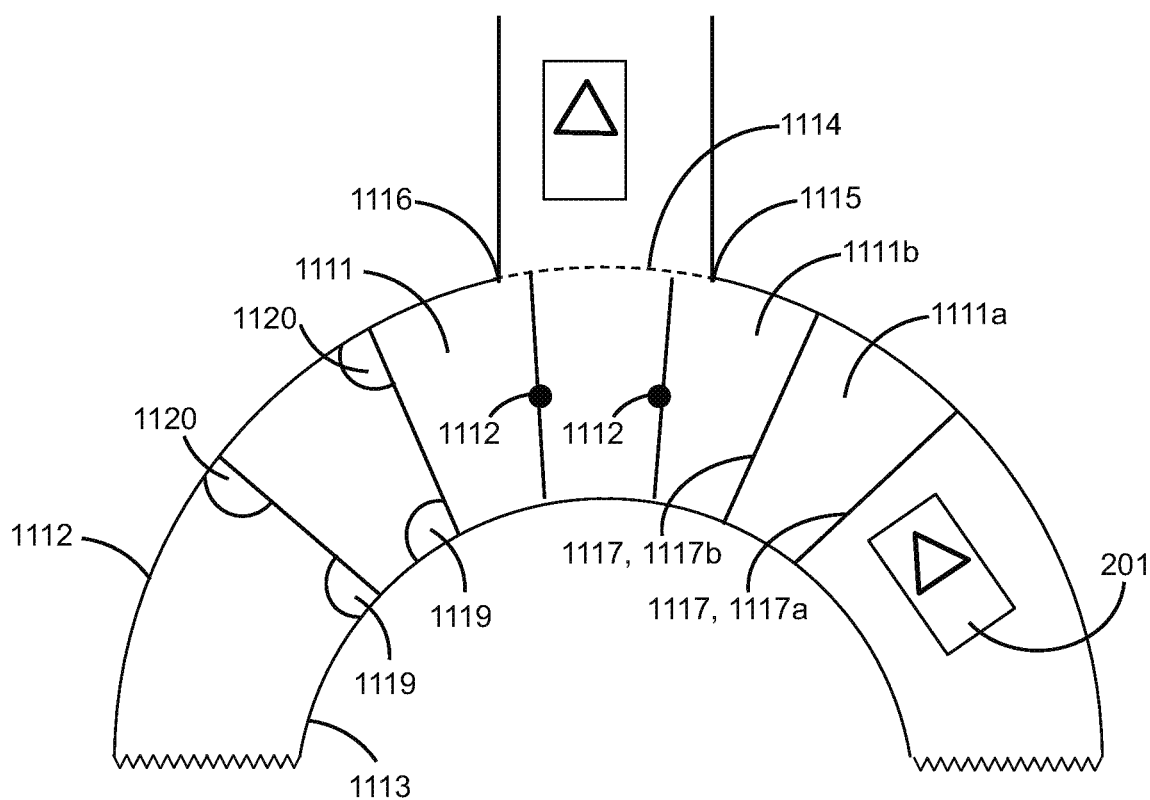
FIG. 11 shows possible operations associated with the first, second, and third traffic scenarios.
Figure 12:
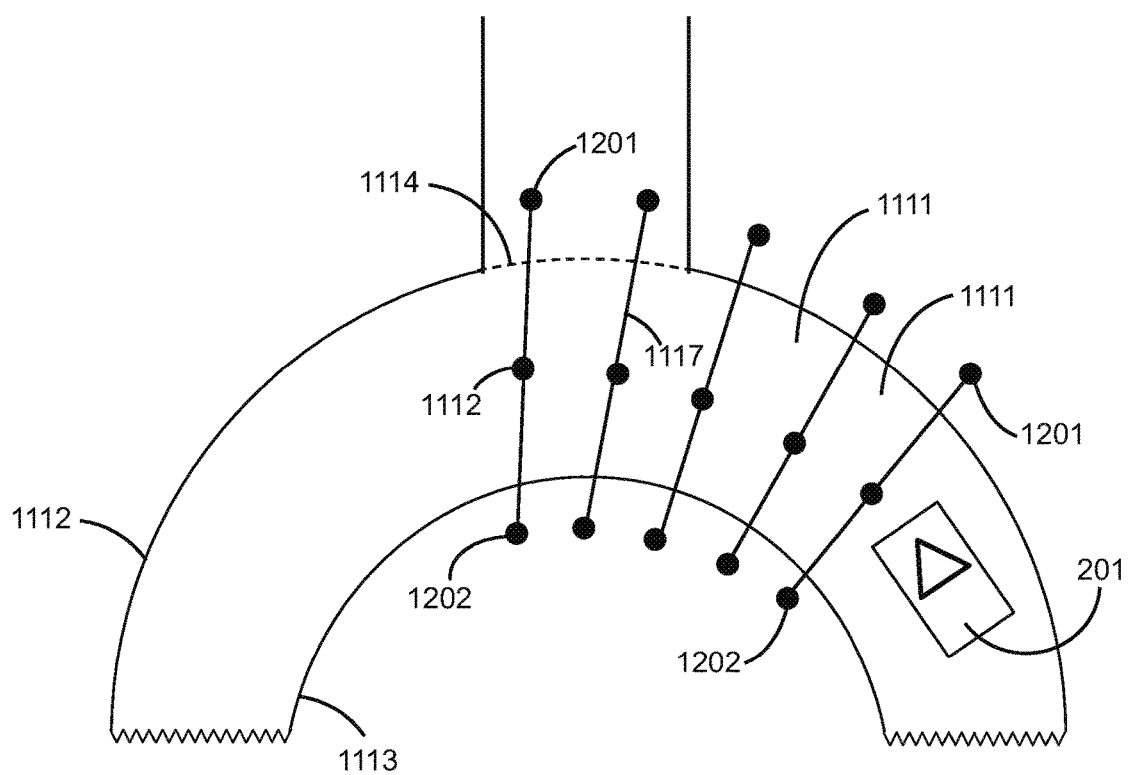
FIG. 12 shows possible operations associated with the first, second, and third traffic scenarios.
Figure 13:
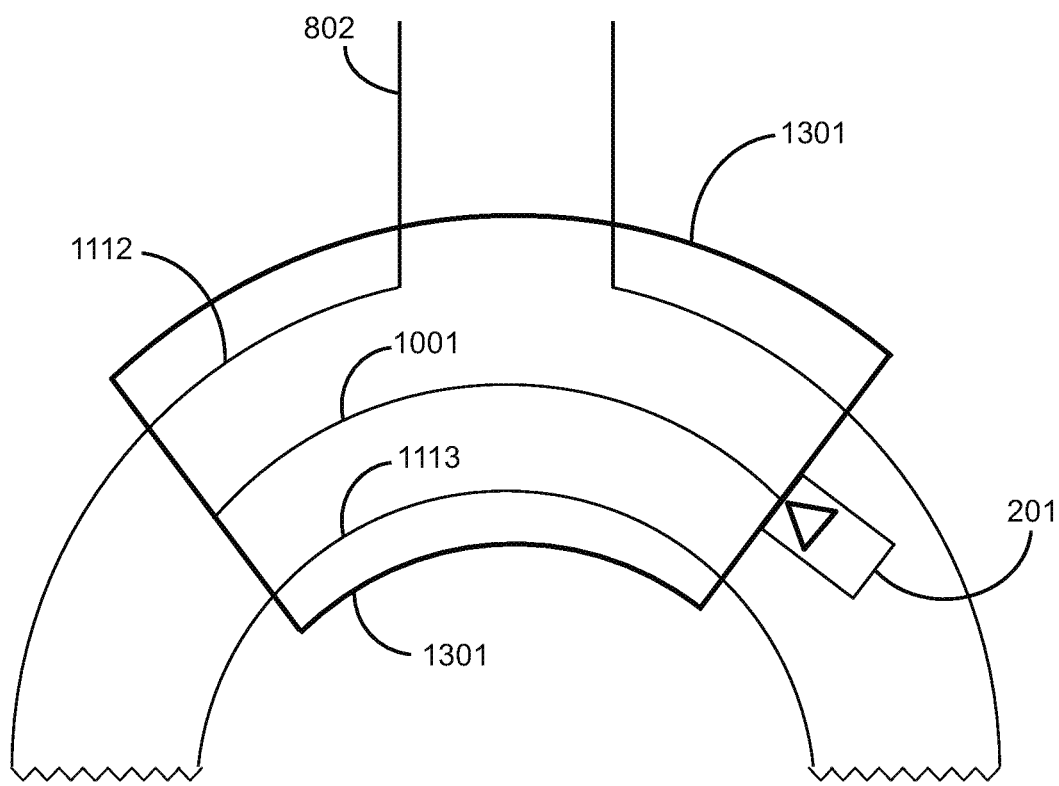
FIG. 13 shows possible operations associated with the first, second, and third traffic scenarios.
Figure 14:
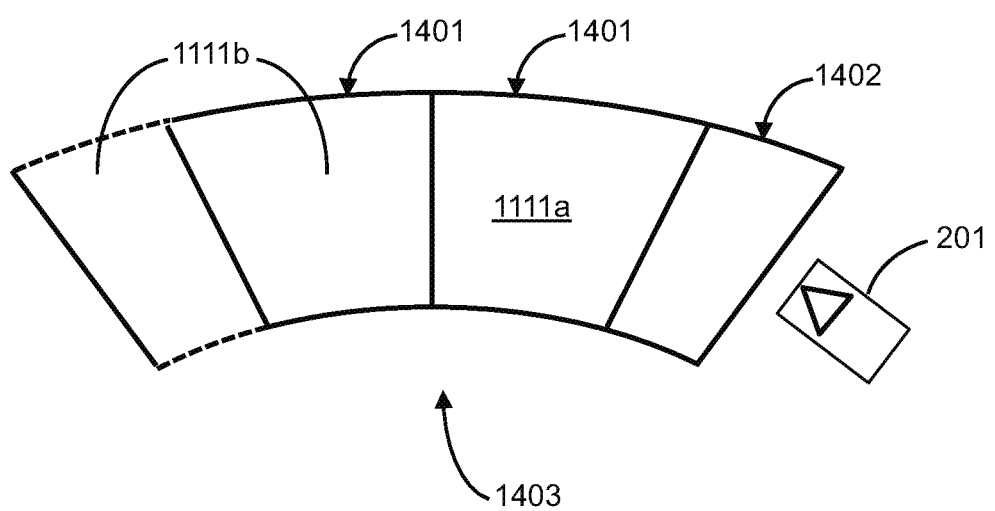
FIG. 14 shows possible operations associated with the first, second, and third traffic scenarios.

As shown in FIG. 11, the current lane of second vehicle 201 may be segmented into slices 1111. Each slice 1111 may be defined to exist between the outer and inner lane boundaries 1112, 1113 defining lane 501c (as identified in virtual map 402). Each slice 1111 may be defined to have the same (e.g., approximately the same) surface area. Each slice 1111 may be defined to have any surface area less than a predetermined slice surface area.

Because driveway 502 intersects lane 501c, an extra boundary 1114 may be applied to separate driveway 502 from lane 501c. The extra boundary 1114 may be a straight line defined between opposing ends 1115 and 1116 of outer boundary 1112. The extra boundary 1114 may already exist in the virtual map. The extra boundary 1114 may be curved with a curvature interpolated between the divided sections of outer boundary 1112.

Each slice may be defined between outer and inner boundaries 1112, 1113, and transverse boundaries 1117. Each transverse boundary 1117 may be set so as to intersect both boundaries 1112 and 1113 at angles 1119, 1120 within a predetermined range (e.g., ±10%) of 90 degrees. As shown in FIG. 11, the transverse boundary 1117b of a first slice 1111a may serve as the transverse boundary 1117b of an adjacent slice 1111b. The above-described process may be iterative, with continued resizing of slices 1111 (and thus repositioning of the transverse boundaries 1117) until the above-described conditions are met. Thereafter, a midpoint 1122 of each transverse boundary 1117 is found. Ideal path 1001 is then interpolated based on midpoints 1122 (e.g., ideal path 1001 may be a best fit line intersecting each midpoint 1122).

To correct for real-world conditions (e.g., second vehicle 201 deviating from ideal path 1001), ideal path 1001 may be widened to form a practical path 1301. To find practical path 1301, a series of outer and inner practical points 1201, 1202 may be found. Outer practical points 1201 may be defined to lie on transverse boundaries 1117 a predetermined distance outside outer boundary 1113 or outside of ideal path 1001. Inner practical points 1202 may be defined to lie on transverse boundaries 1117 a predetermined distance inside boundary 1113 or inside ideal path 1001.

Returning to FIG. 9, path 902 of second vehicle 201 may thus be set as practical path 1301 or as ideal path 1001 (depending on the embodiment applied). Host vehicle 200 may apply any of the above-discussed operations or any other suitable operations to predict a host path (and associated times or ranges thereof). Host vehicle 200 determines whether the host path (not shown) intersects second vehicle path 902. If an intersection is present, then host vehicle 200 determines whether the intersection will occur simultaneously (e.g., at a single point in time or within a certain intersection range of the single point in time). It should thus be appreciated that, with reference to FIG. 9, if second vehicle 201 were following lane 501d instead of lane 501c and host vehicle 200 was projected to only occupy driveway 802 and lane 501c, host vehicle 200 may project no collision if the path of host vehicle 200 does not intersect the path of second vehicle 201.

To find a simultaneous intersection, host vehicle 200 may run through a series of time intersection intervals. At each time interval, it may be determined whether the predicted occupation area of host vehicle 200 intersects (or comes within a predetermined distance of) the predicted occupation area of second vehicle 201. The predicted occupation areas are at least the dimensions of the respective vehicles and may be larger since, as discussed below, each vehicle may be predicted to occupy a range of locations at any given point in time.

To account for timing of second vehicle 201, each transverse boundary 1117 may be mapped to a front center of the forward bumper of second vehicle 201 and may be paired with a point in time (or a range of points in time) based on current properties of second vehicle 201 (e.g., velocity, acceleration). If ranges are applied, then the ranges may become wider as distance from the current position of second vehicle 201 increases.

As one example, first transverse boundary 1117a may be associated with one second in the future and second transverse boundary 1117b may be associated with three seconds in the future. As another example, first transverse boundary 1117a may be associated with one to four seconds into the future (a range of three seconds), second transverse boundary 1117b may be associated with three to seven seconds into the future (a range of four seconds), and a third transverse boundary (not labeled) may be associated with five to eleven seconds into the future (a range of six seconds). Times associated with the inner areas of slices 1111 may be interpolated between consecutive transverse boundaries 1117. Parallel with these operations, timing of the host vehicle path is also determined using the same or any other suitable techniques.

Each intersection time interval is mapped to any position of second vehicle 201 and host vehicle 200 corresponding to the time interval. For example, if the intersection time interval is 0.1 seconds, then every position of second vehicle that occur at 0.1 seconds is identified as corresponding. Imagine that first transverse boundary has a time range of 0.01 seconds to 0.2 seconds and that second transverse boundary has a time range of 0.1 seconds to 0.4 seconds. According to this example, all of first slice 1111a would correspond to the intersection time interval of 0.1 seconds. Thus, the occupation area of second vehicle 201 at a 0.1 intersection time interval would include all of first slice 1111a.

To account for the body of second vehicle 201 having a two dimensional area, each occupation area may be extended. For example, when the path is mapped to the center of the front bump of second vehicle 201, the occupation area may extended toward the current position of second vehicle 201 to account for the body of second vehicle 201. For example, and with reference to FIG. 14, the corresponding range of positions 1401 at a third time interval of 0.3 seconds (0.1*3, wherein 3 represents the time interval) may be all of first slice 1111a and a portion of second slice 1111b. A body area 1402 is added to the corresponding range of positions 1401 to generate a total occupation area 1403 equal to the area of 1401 plus the area of 1402. For reasons previously discussed, as the time interval advances, the total occupation area increases. For example, at a time interval of 0.1, the total occupation area may be 100 meters$^2$. At the next time interval of 0.2 seconds, the total occupation area may be 150 meters$^2$. At the next time interval of 0.3 seconds, the total occupation area may be 250 meters$^2$.

The same or other suitable operates are performed for host vehicle 200. If the occupation areas of host vehicle 200 and second vehicle 201 overlap at any given time intersection interval (or come within a predetermined distance of each other), then a simultaneous intersection is found to exist. Advancement through the time intervals may only be performed until a simultaneous intersection is determined to be present (i.e., ended once a simultaneous intersection is determined to be present). If a simultaneous intersection is present for a certain time interval, then the calculation ends and a CT alert is immediately issued. If no simultaneous intersection is present, then the calculation may advance to the next time interval.

As stated above, the operations discussed with reference to FIGS. 8 to 14 may apply to non-CT alert systems (e.g., other forms of collision threat assessment). The operations discussed with reference to FIGS. 8 to 14 may be applied to any of the previously discussed embodiments, including any embodiments discussed with reference to FIGS. 1 to 7.

The invention claimed is:

1. A host vehicle comprising:
   motor(s), brakes, sensors, processor(s) configured to:
   recognize a lane of a target vehicle;
   determine a radius of curvature of the lane boundaries of the recognized lane;
   predict a target path of the target vehicle based on lane boundaries of a virtual map and the radius of curvature of the lane boundaries of the recognized lane;
   compare the target path to a predicted host path of the host vehicle; and
   apply the brakes based on the comparison.

2. The host vehicle of claim 1, wherein the processor(s) are configured to build the virtual map based on (a) a received street map and (b) measurements received from the sensors.

3. The host vehicle of claim 2, wherein the sensors comprise a camera and the processor(s) are configured to apply lane boundaries to the virtual map based on images captured by the camera.

4. The host vehicle of claim 1, wherein the processor(s) are configured to:
   determine (a) a first radius of curvature of a first lane boundary of the recognized lane, (b) a second radius of curvature of a second lane boundary of the recognized lane, and an intermediate;
   calculate an intermediate radius of curvature based on (a) and (b);
   predict the target path based on the calculated intermediate radius of curvature.

5. The host vehicle of claim 4, wherein the processor(s) are configured to, based on the target path, predict a range of positions of the target vehicle at a first future time and predict a range of positions of the target vehicle at a second future time.

6. The host vehicle of claim 5, wherein the first future time is a predetermined time interval multiplied by a first number, wherein the second future time is the predetermined time interval multiplied by a value, and wherein the value is the first number plus one.

7. The host vehicle of claim 6, wherein the processor(s) are configured such that a total area of the predicted range of positions of the target vehicle at the second future time exceeds a total area of the predicted range of positions of the target vehicle at the first future time.

8. The host vehicle of claim 7, wherein the processor(s) are configured such that a total area of the predicted range of positions of the target vehicle at the first future time exceeds a total area of the target vehicle.

9. The host vehicle of claim 1, wherein the processor(s) are configured to predict the target path and the host path as shapes, each having a two-dimensional surface area.

10. The host vehicle of claim 9, wherein the processor(s) are configured to:
    determine whether the shapes intersect; and
    in response to determining that the shapes intersect at an intersection, calculate a first timespan where the target vehicle reaches the intersection, and a second timespan where the host vehicle reaches the intersection.

11. The host vehicle of claim 10, wherein the processor(s) are configured to determine whether any portion of the first timespan overlaps any portion of the second timespan.

12. The host vehicle of claim 11, wherein the processor(s) are configured to apply the brakes based on a positive overlap determination.

13. A host vehicle comprising:
    motor(s), steering, sensors, processor(s) configured to:
    recognize a lane of a target vehicle;
    determine a radius of curvature of the land boundaries of the recognized lane;
    predict a target path of the target vehicle based on lane boundaries of a virtual map and the radius of curvature of the lane boundaries of the recognized lane;
    compare the target path to a predicted host path of the host vehicle; and
    actuate the steering based on the comparison.

14. The host vehicle of claim 13, wherein the processor(s) are configured to predict the target path and the host path as shapes, each having a two-dimensional surface area.

15. The host vehicle of claim 14, wherein the processor(s) are configured to determine whether the shapes intersect, and based on the determination, calculate a first timespan where the target vehicle reaches the intersection, and a second timespan where the host vehicle reaches the intersection.

16. The host vehicle of claim 15, wherein the processor(s) are configured to determine whether any portion of the first timespan overlaps any portion of the second timespan.

17. The host vehicle of claim 16, wherein the processor(s) are configured to actuate the steering based on a positive overlap determination.

18. The host vehicle of claim 17, wherein the processor(s) are configured to build the virtual map based on (a) a received street map and (b) measurements received from the sensors.

19. A host vehicle comprising:
    motor(s), a warning light, sensors, processor(s) configured to:
    recognize a lane of a target vehicle;
    determine a radius of curvature of the lane boundaries of the recognized lane;
    predict a target path of the target vehicle based on lane boundaries of a virtual map and the radius of curvature of the lane boundaries of the recognized lane;
    compare the target path to a predicted host path of the host vehicle; and
    activate the warning light based on the comparison.

* * * * *